(12) United States Patent
Huang et al.

(10) Patent No.: US 8,046,776 B1
(45) Date of Patent: Oct. 25, 2011

(54) METHOD AND APPARATUS FOR TRANSFERRING FIRMWARE BETWEEN AN OPERATING SYSTEM DEVICE IN A HOST

(75) Inventors: Frank Huang, Pleasanton, CA (US); Xiaohua Luo, San Jose, CA (US); Robert Lee, Fremont, CA (US); James Jan, San Jose, CA (US); Zheng Cao, Union City, CA (US)

(73) Assignee: Marvell International Ltd., Hamilton (BM)

( * ) Notice: Subject to any disclaimer, the term of this patent is extended or adjusted under 35 U.S.C. 154(b) by 1014 days.

(21) Appl. No.: 11/939,891

(22) Filed: Nov. 14, 2007

Related U.S. Application Data

(60) Provisional application No. 60/867,944, filed on Nov. 30, 2006.

(51) Int. Cl.
- *G06F 3/00* (2006.01)
- *G06F 9/44* (2006.01)
- *G06F 9/46* (2006.01)
- *G06F 13/00* (2006.01)
- *G06F 9/45* (2006.01)
- *G06F 9/445* (2006.01)

(52) U.S. Cl. ......... 719/321; 719/319; 717/168; 717/174

(58) Field of Classification Search .................. None
See application file for complete search history.

(56) References Cited

U.S. PATENT DOCUMENTS
2003/0217358 A1* 11/2003 Thurston et al. .............. 717/174

OTHER PUBLICATIONS
Richard Sharpe, Linux Tips IO Redirection, Jan. 28, 2000.*
UNIX Tutorial Three, Oct. 9, 2000.*
Kermit File Transfer and Management as an SSH Subsystem Kermit as an SFTP Replacement, Apr. 16, 2002.*

* cited by examiner

*Primary Examiner* — Andy Ho
*Assistant Examiner* — Craig Dorais

(57) ABSTRACT

A method and system for transferring a firmware file between a host system and a device driver, wherein the host system includes an operating system segmented into a user space and a kernel space is disclosed. Aspects of the exemplary embodiment include using a first type of process file system command in the user space to initiate a transfer of the firmware file between the host system and the device driver, wherein the firmware file exists in the user space and the device driver exists in the kernel space; and using a second type of process file system command in the user space to transfer the firmware file between the user space and the device driver in kernel space.

17 Claims, 4 Drawing Sheets

METHOD AND APPARATUS FOR TRANSFERRING FIRMWARE BETWEEN AN OPERATING SYSTEM DEVICE IN A HOST

CROSS-REFERENCE TO RELATED APPLICATIONS

This application claims the benefit of provisional Patent Application Ser. No. 60/867,944, filed Nov. 30, 2006, assigned to the assignee of the present application, and incorporated herein by reference.

BACKGROUND

In computing, firmware is software that is embedded in a hardware device. It is often provided on flash ROMs or as a binary image file that can be downloaded into existing hardware. In some systems, a host computer transfers the firmware to the hardware device. This transfer of the firmware is handled by a device driver.

For example, firmware downloading from a host system to a device driver in a wireless area local network (WLAN) card is required in some systems. Downloading the firmware file to the card typically requires the driver to access the firmware file. Due to a license or other restriction typically associated with the firmware, however, the firmware file either cannot be installed in the driver, or cannot be accessed by the driver directly from kernel space. For example, the file has to be released under a GPL (General Public License), which is undesirable. In this case, a special application or other method is needed to download the firmware file from user space (file system) of the host system to the device driver in kernel space if the kernel does not support firmware downloading. However, it is typically not desirable to provide a WLAN card with an application that is capable of accessing files from kernel space. Accordingly, it would be desirable to provide an improved method and system for downloading firmware from a host system to a hardware device.

SUMMARY

The present invention provides a method and system for transferring a firmware file between a host system and a device driver, wherein the host system includes an operating system segmented into a user space and a kernel space. Aspects of the exemplary embodiment include using a first type of process file system command in the user space to initiate a transfer of the firmware file between the host system and the device driver, wherein the firmware file exists in the user space and the device driver exists in the kernel space; and using a second type of process file system command in the user space to transfer the firmware file between the user space and the device driver in kernel space.

According to the method and system disclosed herein, pre-existing file system commands are used to access the firmware file and to download the firmware file to the device driver. Because the device driver does not access the firmware file directly, the firmware file may have different license restrictions than the device driver is allowed access to.

DETAILED DESCRIPTION

The present invention relates to an improved method and system for downloading firmware from a host system to a device driver. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
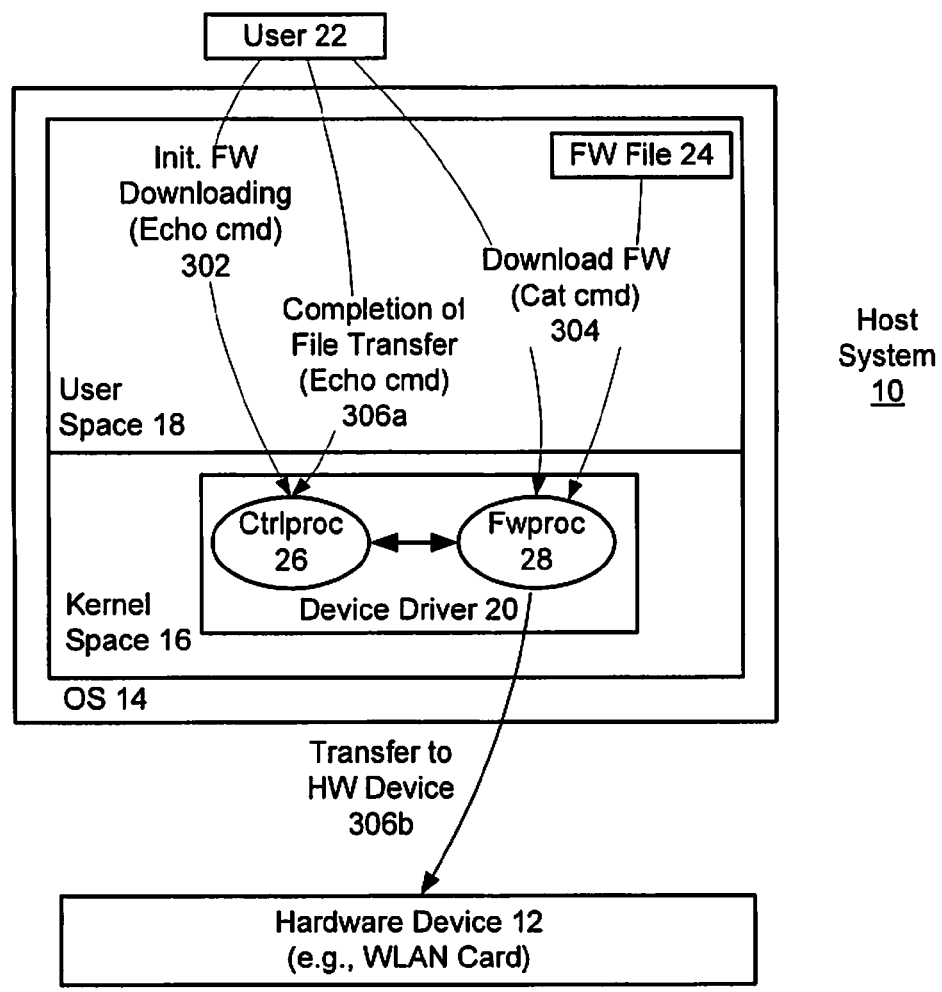
FIG. 1 is a block diagram illustrating an exemplary system for downloading firmware from a host system to a device driver.

FIG. 1 is a block diagram illustrating an exemplary system 8 for downloading firmware from a host system 10 to a device driver 20. The host system 10 is preferably some type of computing system having standard hardware components, such as memory and a processor (not shown), and at least one hardware device 12 that is run or controlled, at least, in part by firmware. An example of such a hardware device 12 includes, but is not limited to, a wireless local area network (WLAN) card, for instance.

In the exemplary embodiment, the host system 10 includes a protected mode operating system 14 that is segregated into a kernel space 16 and a user space 18. Kernel space 16 is a memory area reserved for executing kernel-level components and device drivers. User space 18 is a memory area where user-mode application programs execute. A user 22 interacts with the host computer 10 through programs running in user space 18. The device driver 20 for the hardware device 12 exists in the kernel space 16 in the OS 14 of the host system 10. As is well known in the art, device drivers are computer programs that allow other programs to interact with hardware devices, or to work as if the programs are interacting with a particular hardware device.

Occasionally, a firmware image file 24 may be required to be downloaded from the host system 10 to the hardware device 12. A potential problem exists, however, if the device driver 20 in kernel space 16 is unable to access and download the firmware image file 24 from user space 18 for the corresponding hardware device 12 due to a license or other restriction associated with the firmware image file 24.

The exemplary embodiment provides a method and system for downloading the firmware image file (hereinafter, firmware file) 24 from user space 18 of the host system 10 to the device driver 20. According to the exemplary embodiment, commands of a process file system in the OS 14 are used to enable the device driver 20 to transfer the firmware file 24 from the user space 18 to the kernel space 16. The process file system (procfs) is an existing pseudo-file system provided by UNIX/LINUX-like operating systems to access process information in the kernel. Process file systems typically include several commands, such as a command for initiating a file download from user space 18, and a command for performing a file download. In the LINUX operating system, for example, these commands are referred to as "echo", and "cat", respectively.

According to the exemplary embodiment, process file system commands are used to access the firmware file 24 and to download the firmware file 24 to the device driver 20. By modifying the device driver 20 to interact with the process file system and its existing commands, the device driver 20 can access and download the firmware file 24 in user space 18 without the need of a special application. Because the device driver 20 does not access the firmware file 24 directly, the firmware file 24 may have different license restrictions than the device driver 20 is allowed access to.

Figure 2:
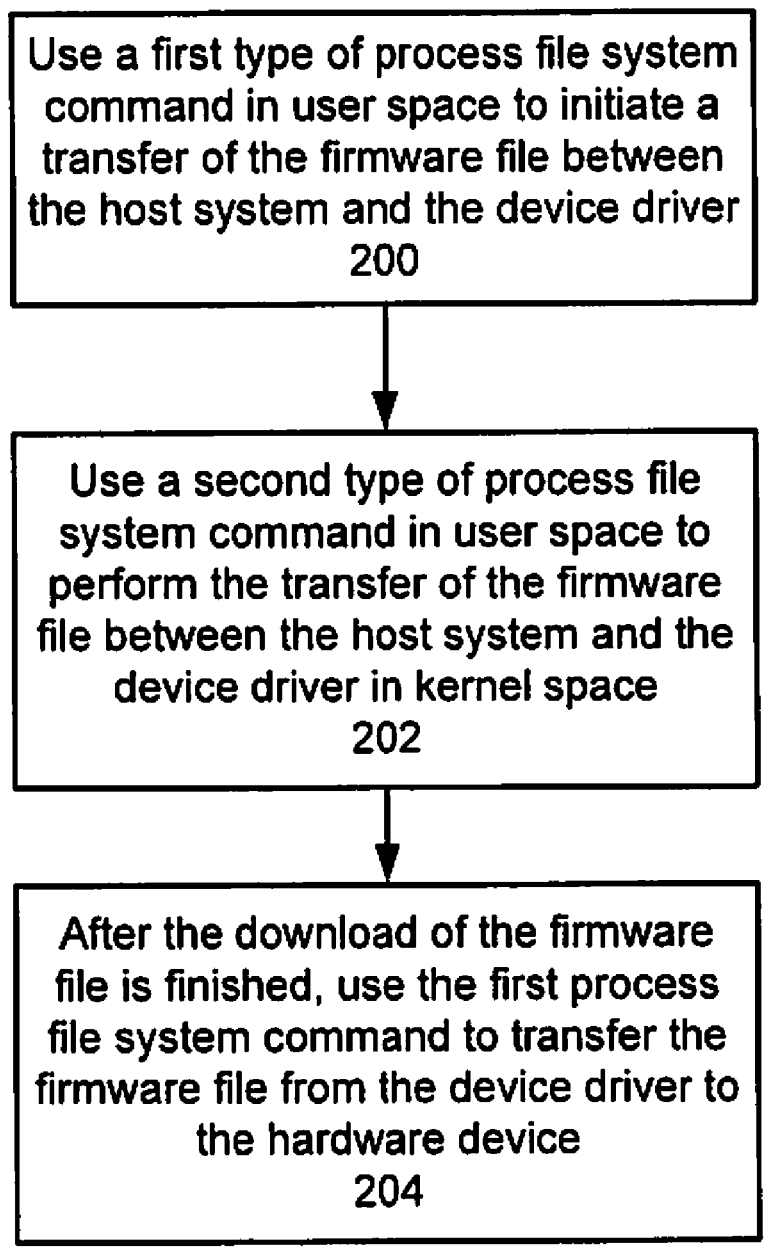
FIG. 2 is a flow diagram illustrating a process for transferring the firmware file between a host system and a device driver in accordance with the exemplary embodiment.

FIG. 2 is a flow diagram illustrating a process for transferring the firmware file 24 between a host system 10 and a device driver 20 in accordance with the exemplary embodiment. The process begins by using a first type of process file system command in user space 18 to initiate a transfer of the firmware file 24 between the host system 10 and the device driver 20 (step 200). A second type of process file system command in user space 18 is then used to perform the transfer the of the firmware file 24 between the host system 10 and the device driver 20 in the kernel space 16 (step 202). According to the exemplary embodiment, the existing process file system commands can be used for both reading and writing files from the user space 18. However, in an alternative embodiment, the process file system commands are used to download the firmware file 24 from the host user space 18 to the device driver 20. After the transfer/download of the firmware file 24 is finished, the type of first process file system command is used again to transfer the firmware file 24 from the device driver 20 to the hardware device 12 (step 204).

In the embodiment where the LINUX/UNIX OS or its equivalent is used, the first type of process file system command used to both initiate the transfer of the firmware file 24 from the host system 10 to the device driver 20 and to transfer the firmware file 24 from the device driver 20 to the hardware device 12 after downloading is an "echo" type command, while the second type of process file system command used to perform the download of the firmware file 24 is a "cat" type command.

Figure 3:
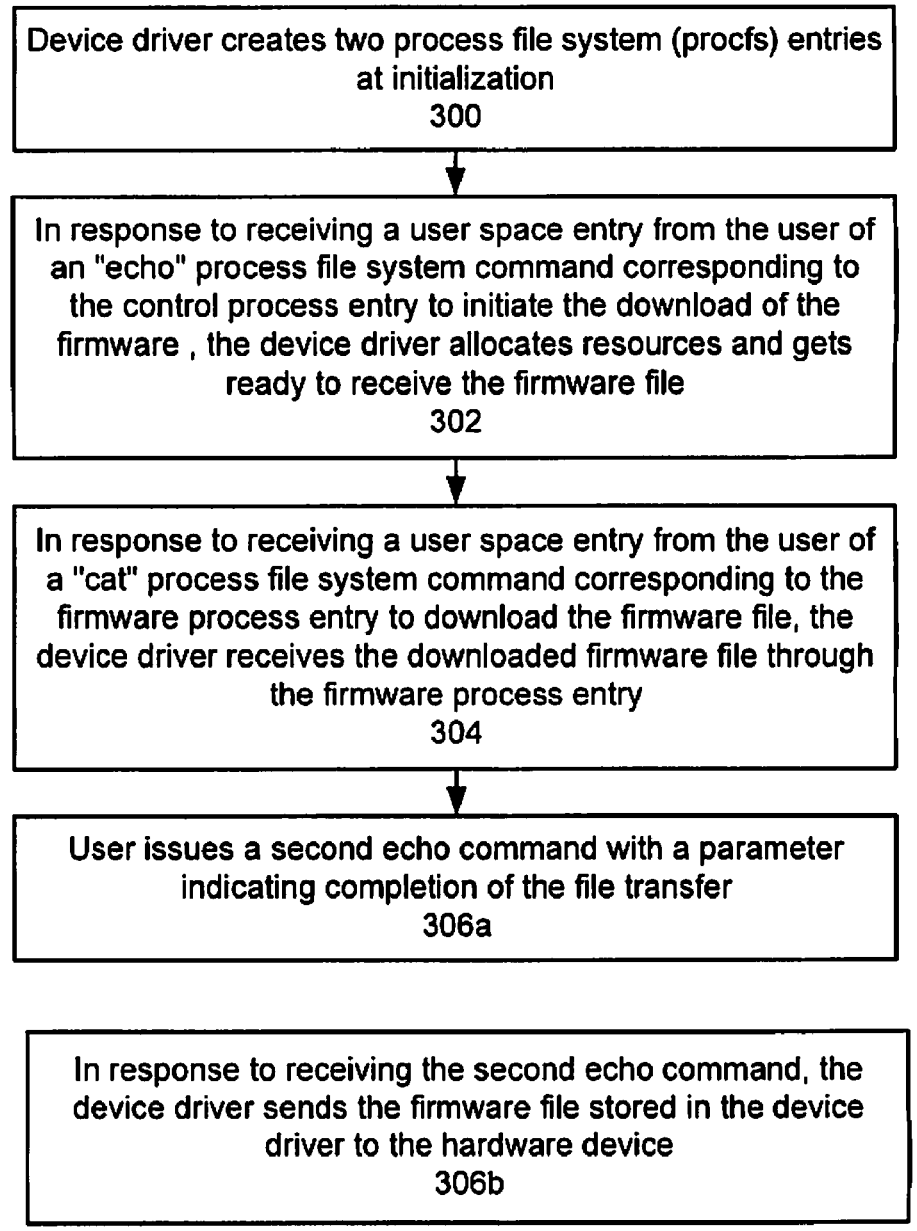
FIG. 3 is flow chart illustrating the process performed by the device driver for downloading the firmware file from the host system using the process file system in accordance with the exemplary embodiment.

FIG. 3 is flow chart illustrating the process performed by the device driver 20 for downloading the firmware file 24 from the host system 10 using the process file system in accordance with the exemplary embodiment. The process begins with the device driver 20 creating two process file system (procfs) entries at initialization (step 300), where one procfs entry is used to control firmware downloading, and the other is used to receive the firmware file 24 from user space 18 during the actual download.

Referring to FIG. 1, in one embodiment, the device driver 20 creates a control process entry (ctrlproc) 26, and a firmware process entry (fwproc) 28 that are responsive to the "echo" and "cat" commands, respectively. The control process entry 26 is used to initiate the download of the firmware file 24 from the user space 18 to device driver 20 and to communicate to the device driver 20 that a download of the firmware file 24 is ready. The firmware process entry 28 receives the firmware file block-by-block during the download. Once the download is complete, the control process entry 26 is used a second time to trigger the transfer of the firmware file 24 to the hardware device 12 from the device driver 20.

Referring to both FIGS. 1 and 3, in response to receiving a user space entry from the user 22 of the "echo" process file system command corresponding to the control process entry 26 to initiate the download of the firmware 24, the device driver 20 allocates memory resources and waits to receive the firmware file 24 (step 302). For example, the command may be entered with the format "echo 0>/proc/ctrlproc" at a command line prompt, where "0" is a parameter of the command indicating the initiation of the download. The echo command communicates to the control process entry 26 that a download of the firmware file 24 is ready. In response, the device driver 20 allocates necessary resources and waits to receive the firmware file 24 after this command is received.

In response to receiving a user space entry from the user 22 of the "cat" process file system command corresponding to the firmware process entry 28 to download the firmware file 24, the device driver 20 receives the downloaded firmware file 24 through the firmware process entry 28 (step 304). For example, the user may enter the command "cat firmware.txt>/proc/firmwareproc", where "firmware.txt" is an example file name for the downloaded firmware file 24.

According to one embodiment, the firmware file 24 may be downloaded from user space 18 to the device driver 20 through the firmware process entry 28 block-by-block. According to this embodiment, the device driver 20 allocates memory dynamically to receive each block, and the previous memory block is freed before a new one is allocated for next block, as described below in conjunction with FIG. 4. After the downloading of the firmware file 24 is finished, the firmware file 24 is saved in the device driver 20.

To trigger the downloaded firmware file 24 being sent to a hardware device 12, the user 22 issues a second echo command from user space 18 with a parameter indicating completion of the file transfer. For example, the user 22 may enter the command "echo 1>/proc/ctrlproc", where "1" is the parameter indicating completion of the transfer/download (step 306a). In response, to receiving the second echo command, the device driver 20 sends the firmware file 24 stored in the device driver 20 to the hardware device 12 (step 306b).

Figure 4:
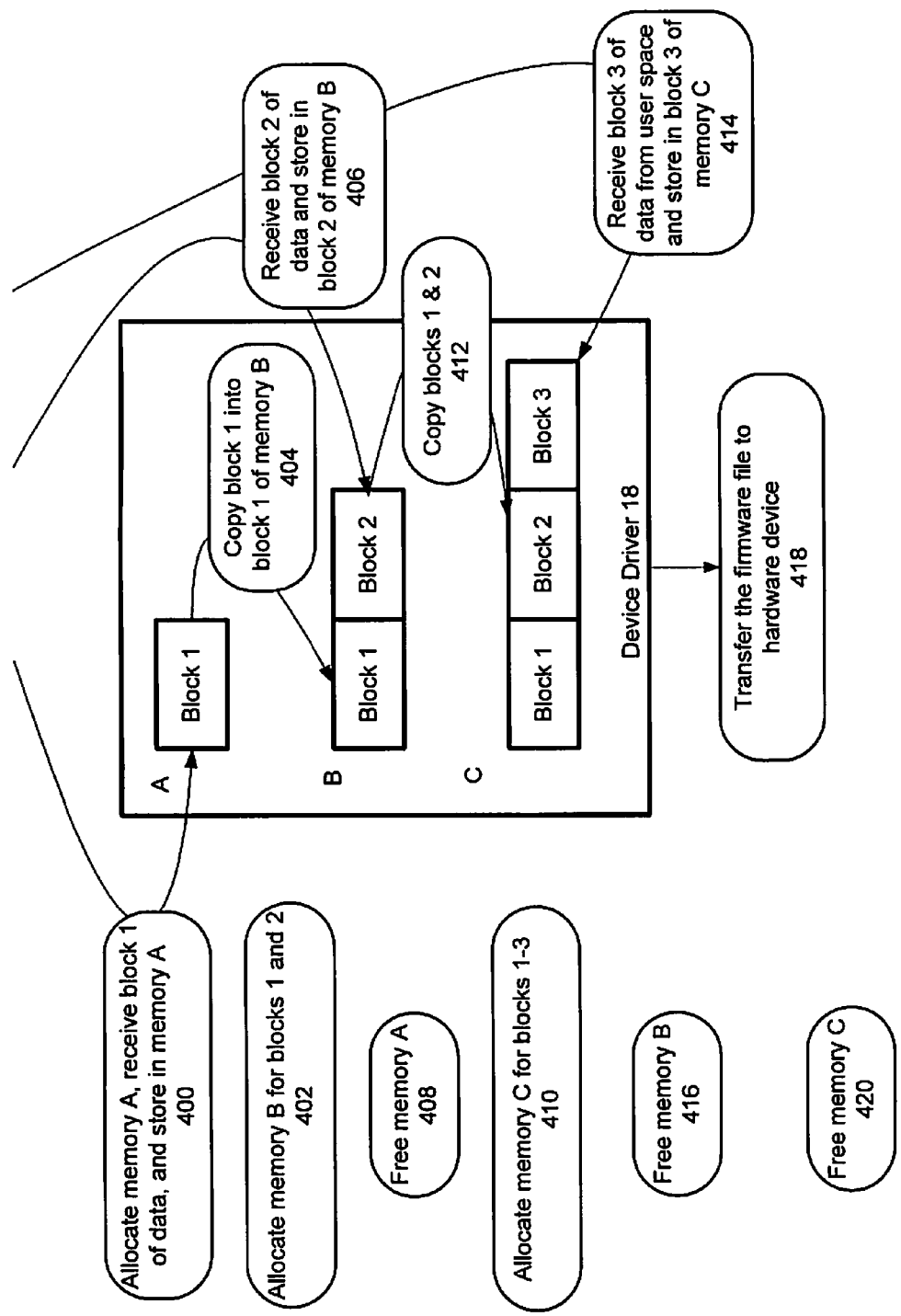
FIG. 4 is a diagram illustrating a memory allocation process performed by the device driver during firmware file downloading in order to receive the firmware file one block at a time.

FIG. 4 is a diagram illustrating a memory allocation process performed by the device driver 20 during firmware file downloading in order to receive the firmware file 24 one block at a time. Because the device driver 20 does not know the total size of the firmware file 24 being downloaded and receives the firmware file 24 block-by-block, the device driver 20 allocates a memory having a size of a currently received data block and the previously received data block to save memory.

Once the device driver 20 receives the command to initiate firmware download, e.g., the "cat" command, the device driver 20 allocates memory A having a size of block 1, receives block 1 of data from user space 18 and stores the data in memory A (step 400).

The device driver 20 allocates a new memory B having a size of two blocks, blocks 1 and 2, or the sum of memories A and B (step 402). The device driver 20 copies block 1 of data stored in memory A into block 1 of memory B (step 404). The device driver 20 receives block 2 of data from user space 18 and stores the data in block 2 of memory B (step 406). The device driver 20 frees memory A, which was allocated for block 1 of the data (step 408).

The device driver 20 allocates a memory C having the size of the three blocks, blocks 1, 2 and 3, or the sum of memories A, B, and C (step 410). The device driver 20 copies the data stored in blocks 1 and 2 of memory B into blocks 1 and 2 of memory C (step 412). The device driver 20 receives block 3 of data from user space 18 and stores the data of block 3 of memory C (step 414). The device driver 20 frees memory B, which was allocated for blocks 1 and 2 of the data (step 416).

If all of the data blocks of the firmware file 24 have been received, then the firmware file 24 stored in memory C will be transferred to hardware device 12 when the command signaling completion of the file transfer is received (step 418). The device driver 20 frees memory C after firmware file 24 is sent to the hardware device 12 (step 420). Otherwise, steps 410 through 416 are repeated until all data blocks of the firmware file 24 are received.

A method and system for implementing an improved method and system for downloading firmware from a host to a device driver has been disclosed. Exemplary embodiment utilizes existing capability provided by the OS 14 to minimize the work necessary to download and firmware file 24 from user space 18 to kernel space 16th, but without allowing the device driver 20 to access the file at all. In one embodiment, before the firmware file 24 is distributed for downloading, the format of the firmware image, which is a binary file, is changed to match the format of the particular hardware device 12. In another embodiment, the firmware file 24 can be encrypted prior to downloading, and then decrypted within the hardware device 12, but the firmware file data need not be processed by the device driver 20.

The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Accordingly, many modifications may be made by one of ordinary skill in the art without departing from the spirit and scope of the appended claims.

We claim:

1. A method of transferring a firmware file between an operating system of a host and a hardware device of the host, the method is executed by a processor and comprises performing N cycles, where N is an integer greater than 1 and is based on a number of blocks of data remaining in the firmware file and not already transferred between the operating system and the hardware device, wherein each of the N cycles comprises:
    transferring a first block of data to a first segment of a memory of a computer system, wherein the memory is allocated to a device driver, wherein the first block of data is transferred from a firmware file source to the first segment during a first one of the N cycles, wherein the first block of data is transferred from a second segment of the memory to the first segment during a cycle subsequent to the first one of the N cycles, and wherein the second segment stores a combined block of data;
    transferring a second block of data from the firmware file source to the second segment of the memory;
    copying the first block of data into the second segment; and
    appending the first block of data to the second block of data to form the combined block of data in the second segment, wherein the second block of data sequentially follows the first block of data in the second segment,
    wherein the first blocks of data transferred in the N cycles are different from each other and are transferred to different segments of the memory, and
    the second blocks of data transferred in the N cycles are different from each other and are transferred to different segments of the memory, and
    wherein, during a second one of the N cycles, the transferring of the first block of data comprises transferring the combined block of data formed during the first one of the N cycles from the second segment of the first one of the N cycles to the first segment of the second one of the N cycles.

2. The method of claim 1, wherein:
    the first one of the N cycles comprises
    transferring a third block of data from the firmware file source to a third segment of the memory,
    copying the combined block of data into the third segment, and
    appending the third block of data to the combined block of data in the third segment, wherein the third block of data sequentially follows the second block of data in the combined block of data; and
    the second one of the N cycles comprises transferring the first block of data from the third segment to the first segment instead of transferring the first block of data from the second segment to the first segment.

3. The method of claim 1, where N is equal to a sum of (i) the number of remaining blocks of data in the firmware file and not already transferred between the operating system and the hardware device and (ii) the number of blocks of data previously stored in the firmware file and already transferred between the operating system and the hardware device.

4. The method of claim 1 further comprising:
    using a first file system command in a user space of the operating system to initiate a transfer of the firmware file between the user space and a device driver, wherein the firmware file is stored in the user space, the device driver exists in a kernel space of the operating system, and wherein the operating system is segmented into the user space and the kernel space;
    using a second file system command in the user space to perform the transfer of the firmware file between the user space and the device driver, wherein the second file system command is separate from the first file system command;
    creating a control process entry via the device driver (i) at initialization of the transfer and (ii) in response to the first file system command, wherein the control process entry is used to control download of the firmware file; and
    creating a firmware process entry via the device driver (i) at initialization of the transfer and (ii) in response to the second file system command, wherein the firmware process entry is used to receive the firmware file during the download.

5. The method of claim 4, wherein the transfer of the of the firmware file between the user space and a device driver comprises downloading the firmware file from the operating system to the device driver.

6. The method of claim 5, further comprising using the first file system command to transfer the firmware file from the device driver to a hardware device.

7. The method of claim 4, further comprising:
    using a first echo command as the first file system command, wherein the first echo command indicates initiation of the download of the firmware file; and
    using a cat command as the second file system command, wherein the cat command indicates performing the download of the firmware file.

8. The method of claim 4, further comprising:
    using the control process entry a first time to initiate the download of the firmware file from the user space to the device driver; and
    once the download is complete, using the control process entry a second time to trigger the transfer of the firmware file from the device driver to the hardware device.

9. The method of claim 4, further comprising:
  downloading the firmware file from the user space to the device driver based on the firmware process entry block-by-block;
  allocating memories in the device driver to receive each block of the firmware file; and
  freeing a first memory block in the device driver of a first block of the firmware file prior to allocating a second memory block in the device driver for a second block of the firmware file.

10. The method of claim 7, further comprising allocating resources in the device driver to receive the firmware file in response to receiving from the user space the first echo command corresponding to the control process entry to initiate the download of the firmware file.

11. The method of claim 10, wherein the first echo command is entered as echo 0, where 0 indicates initiation of the download.

12. The method of claim 7, further comprising receiving the firmware file via the device driver (i) based on the firmware process entry and (ii) in response to receiving from the user space the cat command corresponding to the firmware process entry to download the firmware file.

13. The method of claim 12, wherein the cat command is entered to indicate a file name for the firmware file.

14. The method of claim 7, further comprising sending the firmware file from the device driver to the hardware device in response to receiving from the user space a second echo command indicating completion of the transfer of the firmware file from the user space to the device driver.

15. The method of claim 14, wherein the second echo command is entered as echo 1 indicating completion of the transfer.

16. The method of claim 9, wherein the downloading of the firmware file block-by-block comprises:
  determining whether a complete version of the firmware file is stored in the memory; and
  downloading the firmware file from the memory to the hardware device when the complete version of the firmware file is stored in the memory.

17. The method of claim 16, wherein the device driver performs the downloading of the firmware file block-by-block from the user space to the device driver (i) independently of a size of the firmware file and (ii) based on a size of a currently received data block and a size of a previously received data block.

* * * * *